Figure 1:
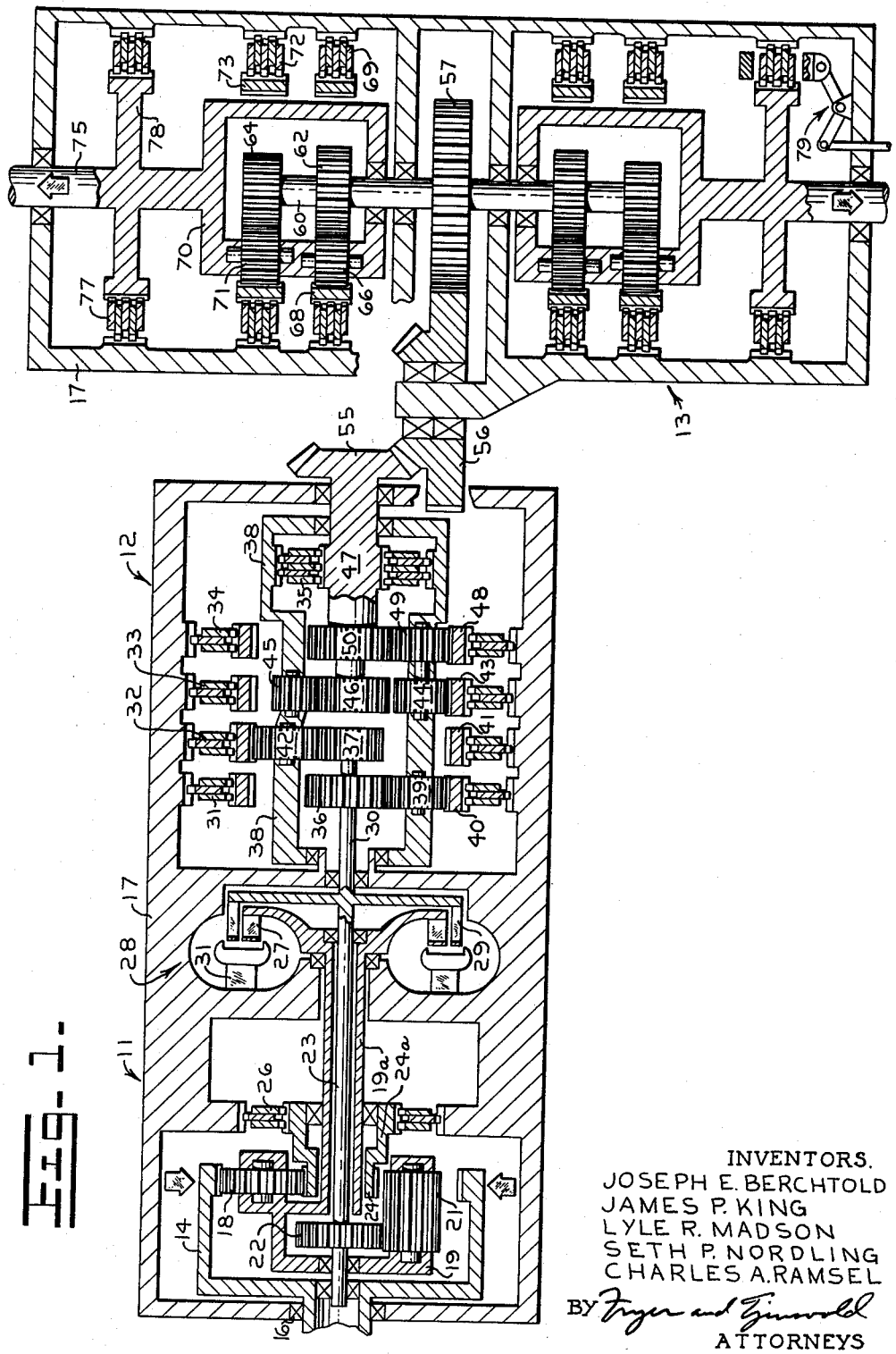
Figure 2:
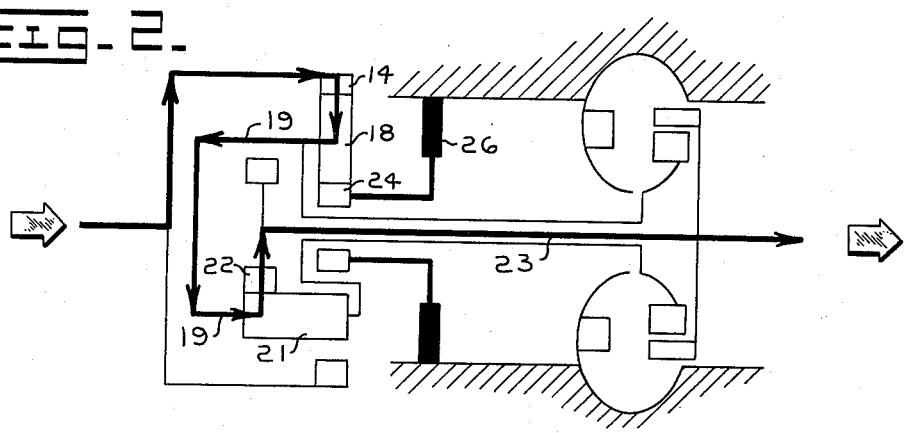
Figure 3:
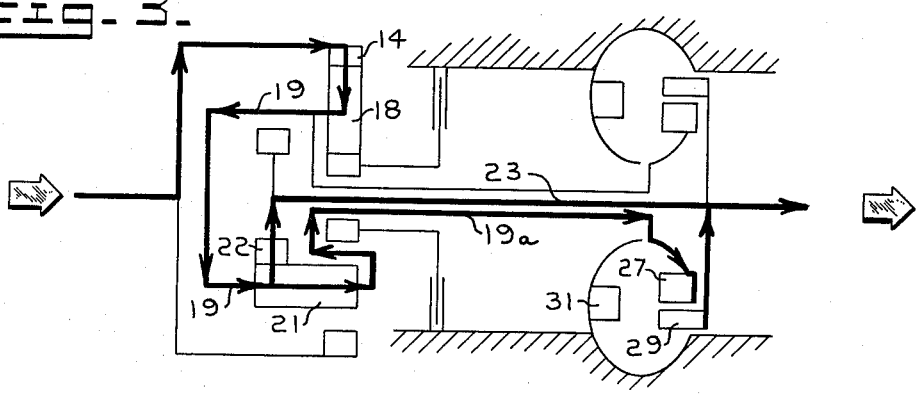

INVENTORS.
JOSEPH E. BERCHTOLD
JAMES P. KING
LYLE R. MADSON
SETH P. NORDLING
CHARLES A. RAMSEL
ATTORNEYS

June 16, 1964 J. E. BERCHTOLD ETAL 3,137,182
TRACK TYPE VEHICLE POWER TRAIN
Filed July 2, 1962 4 Sheets-Sheet 2

INVENTORS.
JOSEPH E. BERCHTOLD
JAMES P. KING
LYLE R. MADSON
SETH P. NORDLING
CHARLES A. RAMSEL
BY
ATTORNEYS

INVENTORS.
JOSEPH E. BERCHTOLD
JAMES P. KING
LYLE R. MADSON
SETH P. NORDLING
CHARLES A. RAMSEL

BY Fryer and Zinsvold
ATTORNEYS

June 16, 1964   J. E. BERCHTOLD ETAL   3,137,182
TRACK TYPE VEHICLE POWER TRAIN
Filed July 2, 1962   4 Sheets-Sheet 4

INVENTORS.
JOSEPH E. BERCHTOLD
JAMES P. KING
LYLE R. MADSON
SETH P. NORDLING
CHARLES A. RAMSEL
BY Fryer and Zimmold
ATTORNEYS

United States Patent Office 3,137,182
Patented June 16, 1964

3,137,182
TRACK TYPE VEHICLE POWER TRAIN
Joseph E. Berchtold, Pekin, James P. King, Peoria, Lyle R. Madson, Morton, Seth P. Nordling, Washington, and Charles A. Ramsel, Peoria, Ill., assignors to Caterpillar Tractor Co., Peoria, Ill., a corporation of California
Filed July 2, 1962, Ser. No. 206,725
7 Claims. (Cl. 74—720.5)

The present invention relates to power trains for track type vehicles and more particularly to power trains which include a torque converter section (front transmission), a range transmission, bevel and transfer gears, and a planetary cross drive transmission to provide ten speeds forward and four speeds in reverse.

The power train of the present invention is designed to provide a drive system for a track-type vehicle which must be capable of performing a wide variety of tasks. Among these tasks are the ability to haul heavy loads at moderate speeds such as the movement of earth in construction operations, the ability to act as a low speed high torque vehicle for towing disabled vehicles or removal of other vehicles from incapacitating terrain, the ability to move heavy loads which may include personnel and equipment at moderately high speed for transportational purposes, and the ability to perform the numerous other tasks which an amphibious vehicle may be called upon to execute. Not only is the present drive train designed to provide a track-type vehicle with the ability to operate at the various driving conditions described above, but it is also highly dependable due to unique simplified construction, and capable of providing full dynamic braking.

The present invention employs a front transmission having a split drive condition where part of the output comes from a planetary gearing system and the other part comes from a torque converter, as well as straight mechanical overdrive condition. While this portion of the drive train operates as if it were composed of two separate planetary systems, the unique design of this torque converter section enables a single carrier construction and the use of a single ring gear to produce the desired split drive result. The output from the front transmission provides the input to the range transmission which provides four forward speeds and two reverse speeds selectable through four stationary clutches (brakes) and a single rotating clutch.

The output from the range transmission is transmitted through a bevel gear arrangement to the planetary cross drive transmission which drives the vehicle track wheels. The planetary cross drive comprises a pair of dual ratio planetary gear systems, the operating ratios of which are independently selectable through stationary brakes.

Accordingly, it is an object of the present invention to provide improvements in vehicle drive trains for track-type vehicles.

It is a further object of the present invention to provide a drive train for a track-type vehicle wherein the drive train has unique simplicity and dependability while having a wide range of operating conditions.

It is another object of the invention to provide a split drive torque converter transmission employing but a single planet gear carrier and a single ring gear wherein the transmission has both a split drive condition and a straight mechanical overdrive condition.

Another object of the invention is to provide a speed transmission which transmits power at any one of four forward speed ratios or two reverse speed ratios wherein only a single planet gear carrier is employed.

Still a further object of the invention is to provide a cross drive transmission which transmits power to the vehicle drive wheels independently and at one of two speed ratios, wherein a single planet gear carrier is employed for each independent set of drive wheels.

It is a further object of the present invention to provide a drive train for a track-type vehicle wherein ten forward speeds and four reverse speeds are selectable through a plurality of clutches, all but one of which are stationary clutches and the single rotating clutch is so situated and of such size as not to require elaborate disengaging means.

Further and more specific objects and advantages of the invention are made apparent in the following specification wherein a preferred form of the invention is described by reference to the accompanying drawings.

In the drawings:

FIG. 1 is a cross sectional semi-schematic side elevation of the power train of the present invention; and FIGS. 2 through 13 are schematic illustrations showing the flow of power through the various transmissions of the power train of FIG. 1 at the plurality of operating gear ratios which the transmissions provide.

Referring now to FIG. 1, the power train of the invention includes a front transmission (torque converter section) 11, a range transmission 12 and a planetary cross drive transmission 13 which combine to provide ten speeds forward and four speeds in reverse.

The output from the vehicle engine (not shown) drives a ring gear 14 which is rotatably mounted in bearing 16 in transmission housing 17. The ring gear drives a short planet gear 18 on planet carrier 19, and the short planet meshes with long planets 21, also on carrier 19, to drive a sun gear 22 on shaft 23. A second sun gear 24 on a sleeve 24a, rotatable about a hollow shaft 19a on the carrier 19, is also engaged by the short planet 18. The rotatable sun gear 24 may be locked to the housing 17 by means of a conventional annular disc brake 26. When sun gear 24 is locked it functions as a positive reaction member and provides a fixed speed ratio between ring gear 14 and short planet 18 and hence through long planet 21 to sun gear 22. Secured on the end of the hollow shaft 19a of carrier 19 is the pump or impeller 27 of a torque converter 28, the output member or turbine 29 of which is splined directly onto the shaft 23. The stator 31 of the torque converter is secured to housing 17 so that operation of the torque converter is continuous regardless of whether brake 26 is engaged or not. Since it is not desirable to have the output of the front transmission affected by torque converter 28 at all times, the torque converter is disabled by draining the working fluid therefrom when straight mechanical drive is desired.

In operation the torque converter is disabled by removal of the fluid therein when rotating sun gear 24 is held as a reaction member by brake 26. In this condition there is no power flow through the torque converter and a fixed ratio speed step-up drive is realized through ring gear 14 and planets 18 and 21 which are restrained by sun gear 22 on the output shaft 23. With brake 26 disengaged and the torque converter filled with fluid, the drive power follows two paths, one a mechanical drive path and the other a torque converter power path. In the torque converter path, power transmitted from ring gear 14 to short planet 18 rotates the carrier 19 and hence the hollow shaft 19a and torque converter impeller 27 connected thereto. From the converter, torque is delivered to the output shaft by turbine 29 which is splined thereto. In the mechanical path, a portion of the input power is transmitted from the driven short planets 18 to long planets 21 and then to the sun gear 22 on the output shaft 23. Thus, in this manner the split drive condition is provided.

In the range transmission 12, power is delivered from the torque converter transmission shaft 23 to range transmission input shaft 30 connected thereto. The various speed ranges available in transmission 12 are activated by operation of conventional disc-type brake mechanisms 31 to 34 and a similar rotating clutch 35, all to be hereinafter described. The power input delivered by shaft 30 is transmitted through selected planetary gear trains by sun gears 36 and 37 to produce rotation of a carrier 38. The sun gear 36 acts to roll the planets 39 around the ring gear 40, functioning as a reaction member when the brake 31 is engaged. This particular planetary gear train provides a reduction in the front portion of the range transmission. Similarly, when brake 32 is engaged to lock ring gear 41 against rotation, the sun gear 37 acts to rotate the planets 42 around the ring gear 41, causing a greater reduction in the front portion of the range transmission. The planet carrier 38 serves to carry power from the front portion of the range transmission to the rear portion from which it is delivered to the output in a selected direction.

For example, the brake 33 activates reverse drive by locking ring gear 43 against rotation so that the planets 44 on the carrier 38 are caused to roll around the ring 43 imparting rotation to reversing pinions 45 which drive sun gear 46 on the output shaft 47. Similarly, operation of the brake 34 locks ring gear 48 against rotation to cause planets 49 to rotate as they revolve with carrier 38 and their rotation is in turn imparted to sun gear 50 also carried on the output shaft 47.

A second forward speed is realized in the rear portion of the range transmission 12 by engagement of the rotating clutch 35 which locks the carrier 38 directly to the output shaft 47 for direct drive from the front portion of the transmission.

Thus, torque is transmitted from the range transmission input shaft 30 to the carrier 38 by selective engagement of brakes 31 or 32. Carrier rotation is then transmitted to the output shaft 47 by selective operation of brakes 33 or 34 for selective directional overdrive, or by engagement of clutch 35 for direct drive.

The planetary cross drive represented generally by reference numeral 13 comprises identical parts approximately symmetrical with respect to the vehicle center line and on a common axis. Therefore, a description of only one side will suffice. Power is supplied from the range transmission through bevel gears 55 and 56 to input pinion 57 on the cross drive shaft 60 on which are splined sun gears 62 and 64. The sun gear 62 transmits power to planets 66 when a ring gear 68 is grounded (locked) by engagement of the high range planetary gear train brake 69 to impart rotation to planet carrier 70. Similarly, sun gear 64 transmits power to planets 71 upon activation of the low range planetary train brake 72 to lock ring gear 73 against rotation. Thus, high and low range reduction planetary gear trains are provided to drive the planet carrier 70 and, hence, the cross-drive output shaft 75 to which the carrier is directly splined. Braking of the carrier 70 and output shaft 75 may be accomplished by engagement of a brake 77, having elements alternately splined to the housing 17 and a flange 78 on the shaft 75.

OPERATION

The operation of the power train and the respective gear ratios at which it operates are described as follows:

First Speed Forward
FRONT TRANSMISSION

By separate controlling means, the front transmission can be operated in either of two separate conditions:

*As a split torque drive (FIG. 3).*—Torque converter power path: In this condition, the torque converter is filled with fluid so that rotation of impeller 27 drives turbine 29, whereby the torque converter can then furnish output torque to shaft 23. Part of the input power is transmitted from ring gear 14 to planets 18 to rotate the carrier 19. A portion of this power is then transmitted through the torque converter by the impeller 27 on the carrier 19, which torque is transmitted to turbine 29 splined onto the shaft 23. Also, a portion of the torque transmitted to planets 18 by ring gear 14 is transmitted through long planets 21 and sun gear 22 to the output shaft 23.

*As a mechanical overdrive (FIG. 2).*—In this condition, the brake 26 is engaged to lock sun gear 24 in place as a reaction member so that short planets 18 will be driven at a fixed speed ratio by the ring gear 14. (The torque converter is drained of fluid). The short planets 18 in turn drive long planets 21 to drive sun gear 22 and, hence, output shaft 23.

RANGE TRANSMISSION (FIGS. 1 AND 5)

In the front portion of the range transmission 12, clutch 32 is engaged in first gear holding ring gear 41 stationary and accomplishing a speed reduction through sun gear 37 and planets 42 to rotate the carrier 38. Carrier 38 serves as the input to the rear portion of the range transmission and, in first speed forward, is directly connected to the output shaft 47 by engagement of the rotating clutch 35, thus driving the bevel gears 55 and 56.

PLANETARY CROSS-DRIVE (FIGS. 1 AND 11)

In the first speed forward, the high reduction or low speed clutches 72 are engaged effecting the speed reduction between the input shaft 60 through sun gear 64 and planets 71 which roll around the stationary ring gear 73 to produce rotation of the carrier 70 and, hence, the cross-drive output shaft 75.

Second Speed Forward
FRONT TRANSMISSION

Either the split drive or mechanical overdrive power paths may be employed as hereinabove described.

RANGE TRANSMISSION

This transmission is unchanged from the first speed forward, i.e. clutch 32 is engaged to rotate the carrier through sun 37 and planets 42, with the torque being delivered directly to the output shaft by engagement of the direct drive rotating clutch 35.

PLANETARY CROSS-DRIVE (FIGS. 1 AND 12)

In a second speed forward the low reduction or high speed clutches 69 are engaged allowing a lower reduction from shaft 60 through sun 62 and planets 66 thus rotating carrier 70 and output shaft 75 around stationary ring gear 68. It will be noted that in shifting from first to second speeds forward, only the cross-drive brakes 69 and 72 are affected.

Third Speed Forward
FRONT TRANSMISSION

As in other speeds either the split or overdrive options are available.

RANGE TRANSMISSION (FIGS. 1 AND 6)

In third speed forward, the brake 31 and clutch 35 are engaged to allow a lower reduction in the front portion of the range transmission and a straight output in the rear portion. Brake 31 holds ring gear 40 stationary allowing power flow through input sun gear 36 and planets 39 to rotate the carrier 38, which drive is transmitted directly to the output shaft 47 and bevel gear 55 by engagement of the direct drive clutch 35.

PLANETARY CROSS-DRIVE

The cross-drive remains in the high range to which it is shifted in second speed forward. In fact, with straight line vehicle operation, the high range clutches 69 are employed at all forward speeds above first.

Fourth Speed Forward
FRONT TRANSMISSION

Optional.

RANGE TRANSMISSION (FIGS. 1 AND 7)

In fourth speed forward clutches 32 and 34 are engaged to hold ring gears 41 and 48 stationary. Input power flow to the carrier 38 is through sun 37 and planets 42 which roll around ring gear 41 rotating the carrier 38. The output from rotating carrier 38 is through planets 49 which drive output sun 50 and, hence, shaft 47 as they roll along stationary ring gear 48.

PLANETARY CROSS-DRIVE

Remains in high range.

*Fifth Speed Forward*

FRONT TRANSMISSION

Optional.

RANGE TRANSMISSION (FIGS. 1 AND 8)

In fifth speed forward the clutches 31 and 34 are engaged to hold ring gears 40 and 48 stationary. Thus, the carrier 38 is rotated as sun gear 36 drives planets 39 around the stationary ring gear 40, and the rotation of the carrier, in turn, causes planets 49 to roll around stationary ring gear 48 and drive output sun gear 50 on the shaft 47.

*First Speed Reverse*

FRONT TRANSMISSION

Optional.

RANGE TRANSMISSION (FIGS. 1 AND 9)

In first speed reverse, brakes 32 and 33 are engaged. The carrier 38 is rotated as sun gear 37 drives planet 42 to cause them to roll around the ring gear 41. This causes the planets 44 to roll around stationary ring gear 43 and drive reversing pinions 45 which, in turn, rotate output sun 46 on shaft 47 in a reverse direction.

PLANETARY CROSS-DRIVE (FIGS. 1 AND 11)

In reverse speeds, the cross-drive is shifted into the high reduction or low speed clutches 72 so that the power from shaft 60 is delivered through sun 64 which, by reason of its engagement with planets 71, cause the carrier 70 and output shaft 75 to rotate at a reduced speed.

*Second Speed Reverse*

FRONT TRANSMISSION

Optional.

RANGE TRANSMISSION (FIGS. 1 AND 10)

In second speed reverse, clutches 31 and 33 are engaged so that the carrier is rotated by sun 36 through planets 39 rolling around stationary ring gear 40 causing planets 44 to roll around stationary ring gear 43 and drive the output sun 46 through reversing pinions 45.

PLANETARY CROSS-DRIVE

Remains in low range.

*Neutral*

Only the range transmission is deactivated. This is accomplished by engaging only one clutch or brake instead of two thus preventing a flow of power through the transmission.

*Braking*

Figure 4:
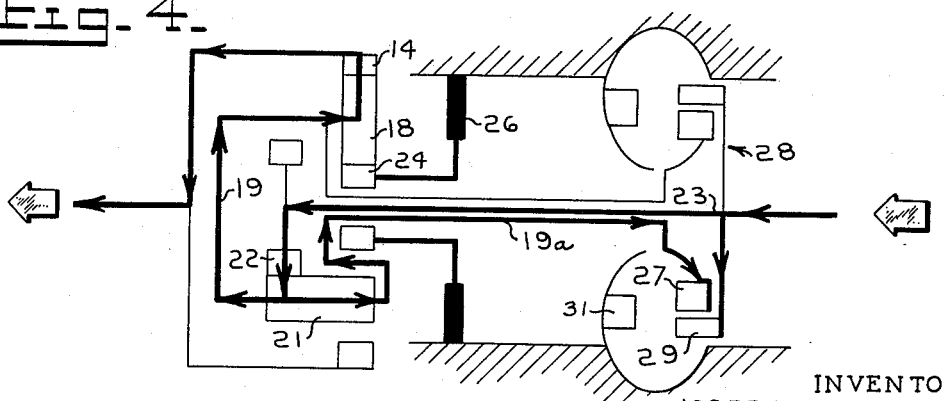
Figure 5:
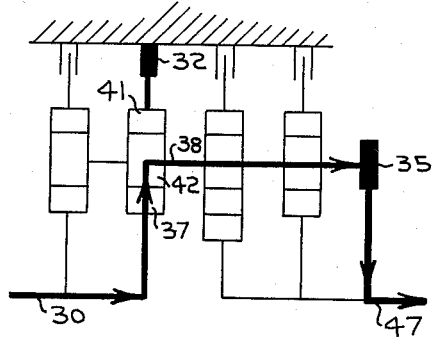
Figure 6:
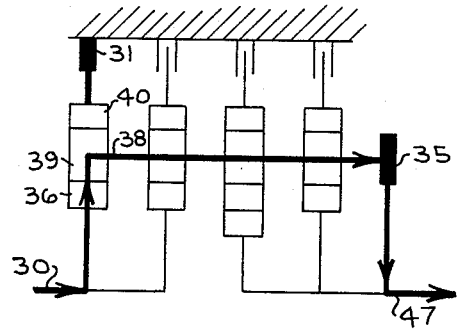
Figure 7:
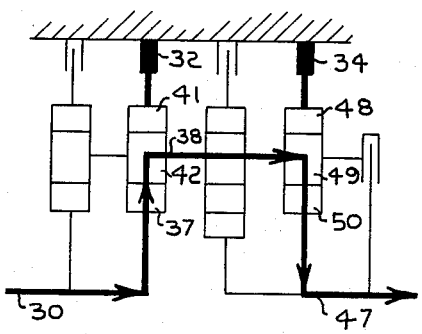
Figure 8:
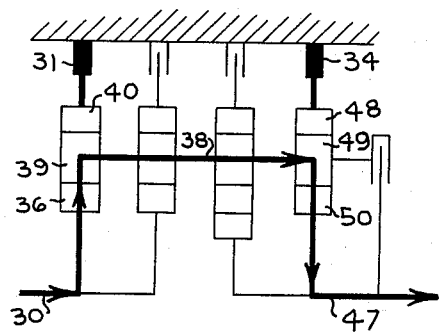
Figure 9:
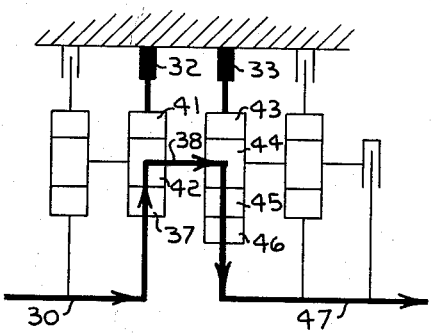
Figure 10:
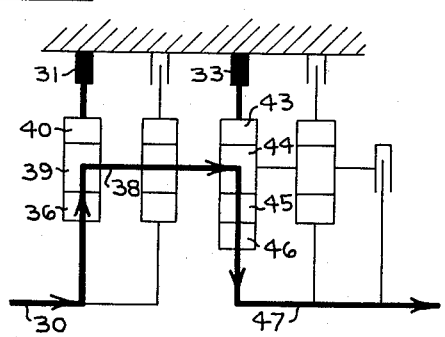
Figure 11:
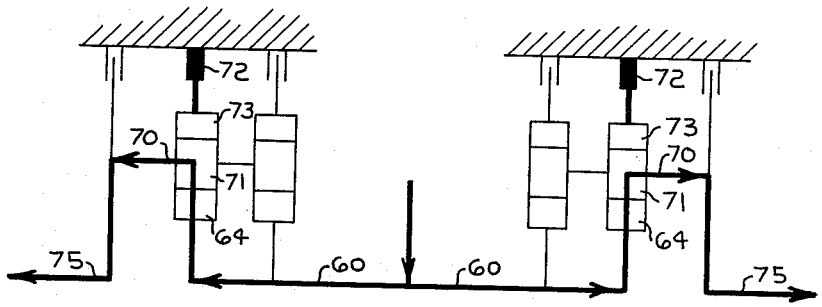
Figure 12:
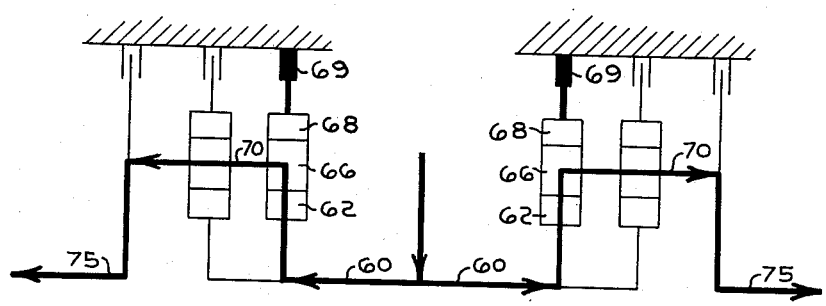

Simultaneous braking of both the left and right cross-drive planet carriers by engagement of brakes 77 will cause vehicle retarding in the conventional manner. Braking can be augmented by partially pressurizing the remaining cross-drive brakes 69 and 72 in proportion to the braking effort required. Dynamic braking is accomplished by engagement of brake 26 at the same time torque converter 28 is filled with fluid. In this arrangement, as best illustrated in FIG. 4, power is delivered by shaft 23 to sun gear 22. The torque converter is also driven by shaft 23 via the connection to turbine 29. Sun gear 22 delivers power to the engine through long planet 21, carrier 19, short planet 18 and ring gear 14. Power is also delivered to torque converter 28 through carrier extension 19a. The degree of dynamic braking can be controlled by the amount of fluid and fluid pressure within torque converter 28. Thus, full dynamic braking is made available and provides the drive train with a most desirable and advantageous feature.

Figure 13:
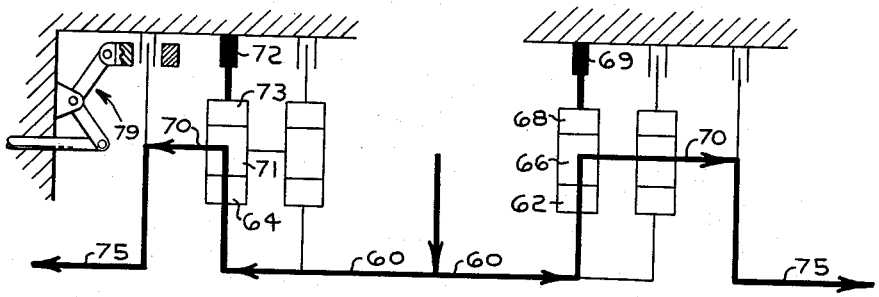

Cross-drive 13 is adaptable to provide either geared steering or brake steering according to the control system devised. For instance, at high speeds geared steering might be preferable wherein different speed ratio brakes are selectively applied as shown by FIG. 13. However, in the high gears it may also be desirable to override the geared steering system and this may be accomplished by disengaging the speed ratio brake on the inside of the turn (for instance brake 72 of FIG. 13) and applying a seperate mechanical system (such as the partial schematic system generally indicated at 79). Mechanical actuators such as 79, which may be independent of the hydraulic system and dependent only upon operator effort, give this cross-drive a greater versatility and provide safer vehicle operation.

What is claimed is:

1. In a vehicle power train the combination comprising;
   a rotatable input ring gear connected to a source of power;
   a rotatable planet carrier;
   a shaft;
   a first sun gear on said shaft;
   a second sun gear rotatably mounted about said shaft;
   a first drive planet set on said carrier engaging said input ring gear and said second sun gear;
   a second drive planet set on said carrier engaging said first planet set and said first sun gear;
   a three member torque converter of the stationary housing type including an impeller connected to said carrier and a turbine splined to said shaft; and
   means for selectively preventing rotation of said second sun gear.

2. In a vehicle power train the combination comprising;
   an input shaft;
   a first sun gear on said shaft;
   a rotatable planet carrier;
   a first drive planet set on said carrier engaging said first sun gear;
   a first rotatable ring gear surrounding said first planet set and in engagement therewith;
   means for selectively preventing rotation of said first ring gear;
   a second sun gear on said shaft;
   a second drive planet set on said carrier engaging said second sun gear;
   a second rotatable ring gear surrounding said second planet set and in engagement therewith;
   means for selectively preventing rotation of said second ring gear;
   an output shaft;
   an output sun gear on said output shaft;
   an output planet set on said carrier and engaging said output sun gear;
   a rotatable output ring gear surrounding said output planet set and in engagement therewith;
   means for selectively preventing rotation of said output ring gear; and
   clutch means between said carrier and said output shaft selectively operable to connect said carrier directly to said output shaft.

3. The power train of claim 2 further comprising;
   a second output sun gear on said output shaft;
   a set of reversing pinions on said carrier engaging said second output sun gear;
   a second output planet set engaging said reversing pinions;
   a rotatable ring gear surrounding said second output planet set and in engagement therewith; and
   means selectively operable to prevent rotation of said last mentioned ring gear.

4. In a vehicle power train the combination comprising;
a rotatable ring gear connected to a source of input power;
a rotatable planet carrier;
a shaft;
a first sun gear on said shaft;
a second sun gear rotatably mounted about said shaft;
a first drive planet set on said carrier engaging said ring gear and said second sun gear;
a second drive planet set on said carrier engaging said first planet set and said first sun gear;
a three member torque converter of the stationary housing type including an impeller connected to said carrier and a turbine splined to said shaft;
means for selectively preventing rotation of said second sun gear;
a second rotatable carrier;
first gear means disposed to form a driving connection between said second carrier and said shaft and including control means by which said gear means is selectively operable for driving said second carrier;
second gear means disposed to form a driving connection between said second carrier and said shaft and including control means by which said second gear means is selectively operable for driving said second carrier;
an output shaft;
output gear means disposed to form a driving connection between said output shaft and said second carrier and including control means by which said output gear means is selectively operable to drive said output shaft; and
clutch means operatively connected between said second carrier and said output shaft and selectively operable to connect said second carrier directly to said output shaft.

5. The vehicle power train of claim 4 further comprising;
an input shaft in driving connection with said output shaft;
a pair of rotatable output carriers each surrounding one end of said input shaft;
a third gear means associated with each of said output carriers disposed to form a driving connection between said input shaft and said carriers and including control means by which said third gear means is selectively operable to drive said carriers;
a fourth gear means associated with each of said pair of rotatable carriers disposed to form a driving connection between said input shaft and said carriers and including control means by which said fourth gear means is selectively operable to drive said carriers; and
a drive shift connected to each of said carriers.

6. The vehicle power train of claim 4 further comprising;
an input shaft in driving connection with said output shaft through gearing centrally located on said input shaft;
a first sun gear at each end of said input shaft;
a rotatable output carrier surrounding each end of said input shaft;
a first drive planet set on each of said output carriers and engaging said first sun gear;
a first rotatable ring gear surrounding each of said planet sets and in engagement therewith;
first brake means associated with said first ring gear and selectively operable to prevent rotation of said first ring gears;
a second sun gear at each end of said input shaft;
a second drive planet set on each of said output carriers and engaging said second sun gears;
a second rotatable ring gear surrounding each of said second planet sets and in engagement therewith;
second means selectively operable to prevent rotation of said second ring gears; and
a drive shaft connected to each of said output carriers.

7. In a vehicle power train the combination comprising;
an input shaft;
an output shaft;
a rotatable carrier;
first gear means disposed to form a driving connection between said carrier and said input shaft and including control means by which said first gear means is selectively operable for driving said carrier;
second gear means disposed to form a driving connection between said carrier and said input shaft and including control means by which said second gear means is selectively operable for driving said carrier;
output gear means disposed to form a driving connection between said output shaft and said carrier and including control means by which said output gear means is selectively operable to drive said output shaft;
clutch means selectively operable to connect said carrier directly to said output shaft;
a second input shaft in driving connection with said output shaft through gearing located generally at the mid-point of said second input shaft;
a pair of rotatable carriers each surrounding one end of said second input shaft;
third gear means disposed to form a driving connection between said carriers and said second input shaft and including control means by which said third gear means are selectively operable for driving said carriers;
fourth gear means disposed to form a driving connection between said carriers and said second input shaft and including control means by which said fourth gear means are selectively operable for driving said carrier; and
a drive shaft connected to each of said carriers.

References Cited in the file of this patent
UNITED STATES PATENTS

| | | |
|---|---|---|
| 2,136,419 | Duffield | Nov. 15, 1938 |
| 2,757,513 | Banker | Aug. 7, 1956 |
| 2,939,344 | Harris | June 7, 1960 |
| 3,033,333 | Breting et al. | May 8, 1962 |
| 3,039,327 | Breting | June 19, 1962 |

UNITED STATES PATENT OFFICE
CERTIFICATE OF CORRECTION

Patent No. 3,137,182                          June 16, 1964

Joseph E. Berchtold et al.

It is hereby certified that error appears in the above numbered patent requiring correction and that the said Letters Patent should read as corrected below.

Column 7, line 54, for "shift" read -- shaft --; column 8, line 7, for "gear" read -- gears --; lines 15 and 16, for "second means selectively operable to prevent rotation of said second ring gears; and" read -- second brake means associated with said second ring gears and selectively operable to prevent rotation of said second ring gears; and --; same column 8, line 51, for "carrier" read -- carriers --.

Signed and sealed this 27th day of October 1964.

(SEAL)
Attest:

ERNEST W. SWIDER
Attesting Officer

EDWARD J. BRENNER
Commissioner of Patents